United States Patent [19]

Kirn

[11] Patent Number: 5,464,365
[45] Date of Patent: Nov. 7, 1995

[54] MOTOR-DRIVEN HAND-HELD MACHINE TOOL

[75] Inventor: Manfred Kirn, Stuttgart, Germany

[73] Assignee: Robert Bosch GmbH, Stuttgart, Germany

[21] Appl. No.: 211,205

[22] PCT Filed: Sep. 3, 1991

[86] PCT No.: PCT/DE92/00735

§ 371 Date: Mar. 21, 1994

§ 102(e) Date: Mar. 21, 1994

[87] PCT Pub. No.: WO93/05927

PCT Pub. Date: Apr. 1, 1993

[30] Foreign Application Priority Data

Sep. 21, 1991 [DE] Germany .................. 41 31 514.6

[51] Int. Cl.[6] .................................. B24B 23/00
[52] U.S. Cl. .................................. 451/344; 451/359
[58] Field of Search .................... 451/344, 358, 451/359, 363, 342, 340

[56] References Cited

U.S. PATENT DOCUMENTS

| | | | |
|---|---|---|---|
| 3,899,852 | 8/1975 | Batson | 451/359 |
| 3,912,411 | 10/1975 | Moffat | 451/342 |
| 4,400,995 | 8/1983 | Palm | 451/359 |
| 4,637,170 | 1/1987 | Block | 451/342 |
| 4,735,020 | 5/1988 | Schulz et al. | |
| 5,042,207 | 8/1991 | Kirn | 451/342 |
| 5,259,145 | 11/1993 | Fushiya et al. | 451/342 |

Primary Examiner—Maurina T. Rachuba
Attorney, Agent, or Firm—Michael J. Striker

[57] ABSTRACT

A motor-driven hand-held machine tool with spindle brake, in particular an angle grinder (1), has a device for clamping a disk-shaped tool (33, 83) at a work spindle (7, 67) between an inner flange (29, 79) and an outer flange (31, 81) which has a central bore hole (39, 84) overlapping the work spindle (7, 67) with play. The outer flange (31, 81) can be screwed on a fastening thread (37, 85) against the working rotational direction of the work spindle (7, 67). The hand-held machine tool is designed in such a way that the clamping pressure on the tool (63, 83) between the inner and outer flange (29, 31, 79, 81) can be increased when the work spindle (7, 67) is braked and the tool (33, 83) continues to rotate because of the inertia resulting from the braking so that the tool (33, 63) cannot be loosened from the work spindle (7, 67) unintentionally when the latter is braked.

13 Claims, 2 Drawing Sheets

MOTOR-DRIVEN HAND-HELD MACHINE TOOL

PRIOR ART

The invention concerns a motor-driven hand-held machine tool according to the generic part of claim 1.

A hand-held machine tool of the generic type is known from U.S. Pat. No. 4,735,020. Its work spindle can be stopped or braked by a spindle stop device and the screwing moment can then be applied by the drive motor for loosening the fastening nut for the grinding tool. The fastening nut may be loosened from the work spindle entirely by hand.

The known hand-held machine tool has the disadvantage that when the work spindle is suddenly stopped after turning off the motor by actuating the spindle stop device, the grinding disk tends to continue rotating as a result of its inertia and, in so doing, to loosen itself and the clamping device from the work spindle.

This unintentional loosening of the clamping device can cause the grinding disk to disengage from the work spindle at high speeds and endanger the operator or bystanders as a result of its high inherent energy.

ADVANTAGES OF THE INVENTION

In contrast to the prior art, the hand-held machine tool according to the invention with the characterizing features of claim 1 has the advantage that an unintentional loosening of the disk-shaped tool, in particular the grinding disk, is prevented also when actuating the spindle stop device at high speeds of the work spindle. This results in a great increase in safety.

Further advantageous constructions of the invention result from the dependent claims.

DRAWING

Embodiment examples of the invention are explained in more detail in the following description with reference to the accompanying drawing.

DESCRIPTION OF THE EMBODIMENT EXAMPLES

Figure 1:
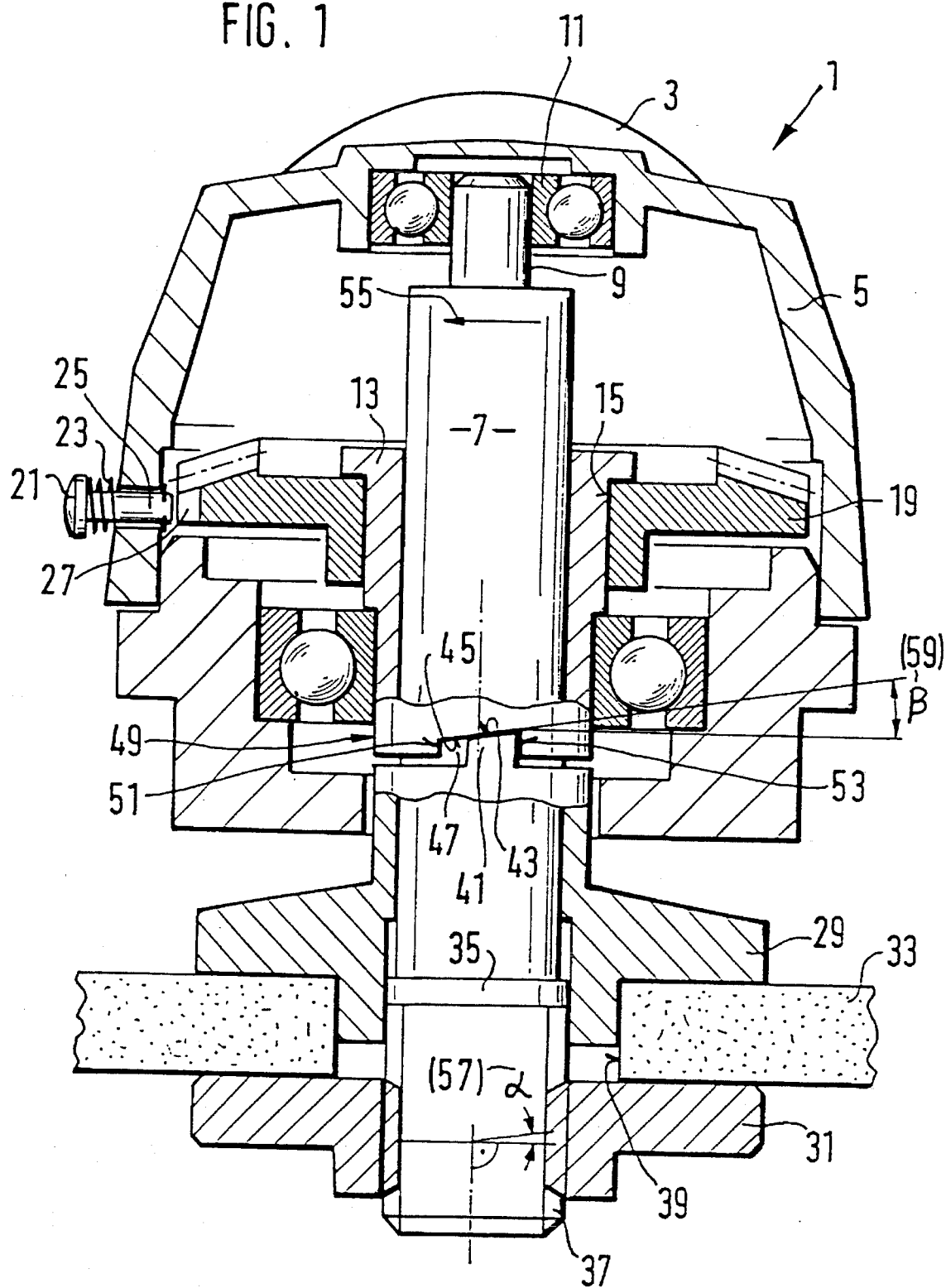
FIG. 1 shows a hand-held machine tool in a first embodiment example of the invention.

The angle grinder 1 shown in FIG. 1 in a sectional view as seen from the front has a motor housing 3 and a gear unit housing 5. A work spindle 7 with a lathed or turned collar 9 is held in a bearing 11 in the gear unit housing 5. Axially adjacent thereto, a stepped sleeve 13 carrying a collar 15 at its upper end is shrunk on to the work spindle 7. On its side remote of the collar 15, the stepped sleeve 13 is arranged in an additional bearing 17 so as to be rotatable, but secured against falling out.

The sleeve 13 supports a bevel gear 19 on its collar 15 in such a way that it is fixed with respect to rotation relative thereto. A spindle stop device 21 arranged in the gear unit housing 5 is associated with the bevel gear 19. The spindle stop device 21 substantially has a pressure pin 25 which is supported so as to be axially displaceable against a spring 23 and can lock into recesses 27 on the outer circumference of the bevel gear 19. By catching in these recesses, it can stop the bevel gear 19 and accordingly the work spindle 7.

A grinding disk 33 is clamped on the free end of the work spindle 7 between an inner flange 29 and an outer flange 31. The inner flange 29 with its bore hole is arranged so as to be rotatable in a defined manner and, on the side of the work spindle 7 remote of the free end, so as to be displaceable axially in a defined manner as far as the collar 35. The outer flange 31 fits on an external thread 37 on the free end of the work spindle 7, the external thread 37 having a slope angle. The grinding disk 33 has a central recess 39 by which it overlaps the work spindle 7 with play. On its side remote of the grinding disk 33, the inner flange 29 carries a gear-like wedge body 41 with an axial wedge face 43 which slopes upward toward the right as seen in the viewing direction at an angle and is supported at an axial counter-wedge face 45 of an approximately U-shaped recess 47 in the end face 49 of the sleeve 13, which axial counter-wedge face 45 slopes upward in the same direction. The lateral defining walls 51, 53 of the U-shaped recess 47 act as radial stops. The U-shaped recess 47 has roughly twice the width of the wedge body 41. When the inner flange 29 is rotated relative to the work spindle 7, the latter is displaced axially by the wedge effect of the wedge faces 43, 45 sliding on one another. Therefore, by rotating the inner flange 29 toward the left as seen in the viewing direction, the clamping pressure on the grinding disk 33 is increased.

The rotating direction of the work spindle 7 is designated by an arrow 55 facing toward the left. The pitch or slope 57 of the thread 37 at angle is less than the slope 59 of the wedge face 43 and counter-wedge face 45 at angle.

When the work spindle 7 is braked suddenly, the grinding disk 33 has a tendency to continue rotating in the original direction due to its mass inertia. In so doing, it tries to turn the outer flange 31 and the inner flange 29 on the work spindle 7. Since the thread 37 is a right-handed thread, a rotation of the grinding disk 33 toward the left causes a loosening moment at the screw connection between the outer flange 31 and the work spindle 7. However, this loosening moment is at least balanced or compensated for by the axial displacement of the inner flange 29 by the sliding of the wedge face 43 on the counter-wedge face 45. In addition, the width of the recess 47 is so dimensioned that the wedge body 41 does not contact the radial stop 51 in the U-shaped recess 47 even in the event of an extremely high loosening moment caused by the mass inertia of the grinding disk 33, since this would prevent further axial displacement of the inner flange 29 and an unintentional loosening of the grinding disk 33 would be possible.

When screwing on the outer flange 31 for clamping the grinding disk 33, the smallest possible distance between the inner flange 29 and the end side 49 of the sleeve 13 is always produced by rotation in the right-hand direction, i.e. the wedge faces 43, 45 are supported one on top of the other. Thus, the wedge body 41 constantly contacts the right-hand defining wall 53 of the U-shaped recess 47 in the clamped state. In this way it is ensured that there will be a sufficient possibility of radial rotation for the inner flange 29 if the spindle stop device 21 is suddenly actuated so that the inner flange 29 can increase the clamping pressure on the grinding disk 33 and accordingly on the outer flange 31 and secures the screwing connection of the outer flange 31 in the manner of a profile nut.

Figure 2:
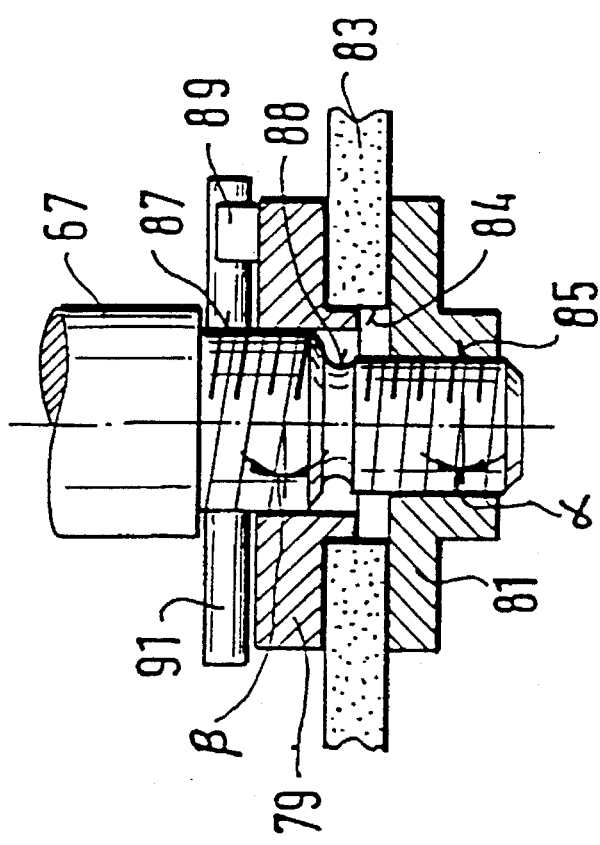
FIG. 2 shows a detail of a second embodiment example of the invention.

The additional embodiment example of the invention which is shown schematically in FIG. 2 has a work spindle 67 on which are screwed an inner flange 79 and an outer flange 81, a grinding disk 83 being clamped between the latter. The grinding disk 83 is provided with a central recess 84 which surrounds the work spindle 67 concentrically with play. The outer flange 81 fits on an external thread 85 having a small pitch—angle of slope—on the free end of the work spindle 67. The inner flange 79 fits on an external thread 87—angle of slope—having a greater inclination to the work spindle 67 which is separated from the external thread 85 by a notch 88.

A projecting stop 89 which projects out axially in the manner of a gear is arranged on the side of the inner flange 79 remote of the grinding disk 83. The stop 89 overlaps a rod-like stop 91 which passes through the work spindle 67 parallel to its diameter and is held therein. The stops 89, 91 accordingly define the rotating possibility and, at the same time, the axial movement of the inner flange 87. The distance between the stops 89, 91 is so dimensioned that even in the event of an extremely high loosening moment due to the mass inertia of the tool 83 the continued rotation of the grinding disk 83 does not result in the stops 89, 91 contacting one another because this would prevent further axial displacement of the inner flange 87 and an unintentional loosening of the grinding disk 83 would be possible.

Figure 3:
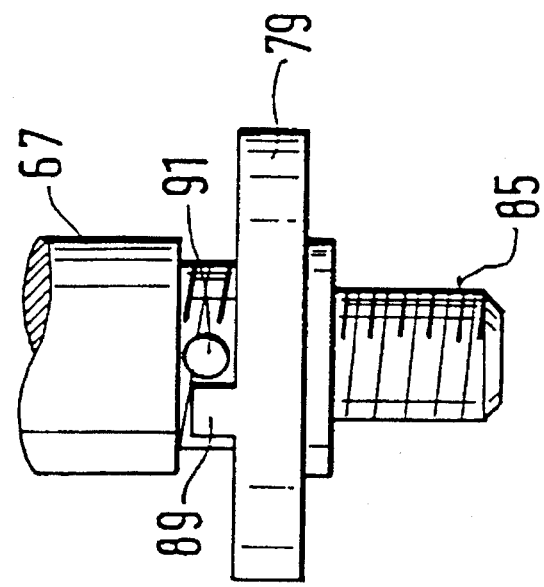
FIG. 3 is another view of the second embodiment example according to FIG. 2.

FIG. 3 shows the embodiment example of FIG. 2 in a position rotated by 90° around the axis of the work spindle to illustrate the arrangement of the inner flange 79 and its stop 89 relative to the stop 91. The second embodiment example operates fundamentally in the same way as shown in FIG. 1, the difference being that the thread 87 according to FIGS. 2 and 3 causes the inner flange 79 to be displaced axially when the latter is rotated, whereas in the embodiment example of FIG. 1 this is effected by the wedge face. If the work spindle 67 is suddenly braked, the grinding disk 83 tries to rotate the inner flange 79 and the outer flange 81 on the work spindle 87 in the loosening direction of the outer flange 81. The clamping pressure on the grinding disk 83 is increased in that the inner flange 79 is axially displaced faster than the outer flange 81 when rotated. Accordingly, the loosening moment at the outer flange 81 is not exceeded and the screw connection between the outer flange 81 and the thread 85 remains stable. An unintentional loosening of this connection is impossible even under extreme conditions so that there is no risk of injury to the operator or bystanders in such cases. Accordingly, a safety device for hand-held machine tools with disk-shaped tools is provided in a simple manner.

In an embodiment example of the invention which is not shown in the drawing, the inner flange is fastened on the work spindle so as to be fixed with respect to rotation and axial displacement relative thereto. The outer flange supports a flange disk which is rotatable in a defined manner so as to abut against wedge faces, the clamping pressure being transmitted to the grinding disk by means of this flange disk. The distance between the flange disk and the outer flange changes when the flange disk is rotated relative to the outer flange. The clamping pressure on the grinding disk is accordingly increased from the side of the outer flange when braking the work spindle.

In the solution according to U.S. Pat. No. 4,735,020, as well as in all other hand-held grinding machine tools with clamping nuts which may be tightened manually, there is a risk that when the spindle comes to an abrupt stop in a design according to the invention the clamping nut will be tightened in such a way that it can only be loosened with an auxiliary tool. For this reason, an important criterion in the use of the invention consists in that the axial displacement of the outer or inner flange is defined.

There is no risk of an excessive clamping torque in the event of an abrupt braking of the spindle when using the invention when a clamping screw according to DE-OS 37 05 638 or DE-OS 38 41 181 is employed.

I claim:

1. A motor-driven hand-held machine tool, comprising a work spindle; a spindle brake; a disc-shaped tool having a central bore hole and surrounding said work spindle with said central bore hole with play; an inner flange and an outer flange between which said disc-shaped tool is clamped; said work spindle being provided with a fastening thread, said outer flange being screwable on said fastening thread against a working rotational direction of said work spindle, said inner and outer flanges and said working spindle being formed so that during braking of said working spindle when said disc-shaped tool continues rotating in the working rotational direction due to its mass inertia, a clamping pressure between said tool and said inner and outer flanges is increased automatically.

2. A motor-driven hand-held machine tool as defined in claim 1, wherein said inner and outer flanges and said working spindle are formed so that the clamping pressure on the tool is increased during braking of said working spindle by said spindle brake.

3. A motor-driven hand-held machine tool as defined in claim 1, wherein said inner and outer flanges and said working spindle are formed so that the clamping pressure on the tool is increased during braking of said working spindle by action of a turned-off motor.

4. A motor-driven hand-held machine tool as defined in claim 1, wherein said inner and outer flanges are formed so that an axial displacement of one of said flanges on said work spindle relative to said disc-shaped tool results from a relative rotation with reference to said work spindle in the working rotational direction.

5. A motor-driven hand-held machine tool as defined in claim 4; and further comprising wedge means, said inner flange being displaced axially in that it is coupled with said wedge means which, when rotating further in the working rotational direction jointly with said disc-shaped tool, are rotated along by said disc-shaped tool, slide against one another, and attempt to reduce an axial distance between one of said inner flange and said disc-shaped tool, and said inner flange and said outer flange.

6. A motor-driven hand-held machine tool as defined in claim 5, wherein said wedge means are formed so that when rotating further in the working rotational direction jointly with said disc-shaped tool they are rotated along by said disc-shaped tool by means of axial contact pressure.

7. A motor-driven hand-held machine tool as defined in claim 5, wherein said wedge means are formed so that when rotating further in the working rotational direction jointly with said disc-shaped tool they are rotated along by said disc-shaped tool by means of a positive-locking engagement.

8. A motor-driven hand-held machine tool as defined in claim 5, wherein said wedge means have wedge surfaces having a slope angle, said inner flange being rotatable in a defined manner in the same screwing direction as said outer flange on said wedge faces.

9. A motor-driven hand-held machine tool as defined in claim 12; and further comprising radial stops which define a rotatability of said inner flange relative to said work spindle.

10. A motor-driven hand-held machine tool as defined in claim 1; and further comprising means for increasing a clamping pressure and arranged in said outer flange.

11. A motor-driven hand-held machine tool as defined in claim 1, wherein said inner flange is arranged so as to be fixed with respect to rotation relative to said work spindle, said outer flange supporting axial displaceable cams facing said tool so that an axial displacement of said cams in direction of said tool in reaching a clamping position is minimal and a maximum is reached when said tool continues to rotate relative to said work spindle as a result of inertia by means of rotational driving.

12. A motor-driven hand-held machine tool, comprising a work spindle; a spindle brake; a disc-shaped tool having a central bore hole and surrounding said work spindle with said central bore hole with play; an inner flange and an outer flange between which said disc-shaped tool is clamped; said work spindle being provided with a fastening thread, said outer flange being screwable on said fastening thread against a working rotational direction of said work spindle, said inner and outer flanges and said working spindle being formed so that during braking of said working spindle wherein said disc-shaped tool continues rotating in the working rotational direction due to its mass inertia, a clamping pressure between said tool and said inner and outer flanges is increased automatically; and said work spindle being provided with a further thread having a steeper angle of inclination than said fastening thread, said inner flange being rotatable on said further thread in a same screwing direction as said outer flange.

13. A motor-driven hand-held machine tool as defined in claim 12; and further comprising radial stops which define a rotatability of said inner flange relative to said work spindle.

* * * * *